(12) United States Patent
Barch et al.

(10) Patent No.: US 11,205,419 B2
(45) Date of Patent: Dec. 21, 2021

(54) LOW ENERGY DEEP-LEARNING NETWORKS FOR GENERATING AUDITORY FEATURES FOR AUDIO PROCESSING PIPELINES

(71) Applicant: INTERNATIONAL BUSINESS MACHINES CORPORATION, Armonk, NY (US)

(72) Inventors: Davis Barch, San Mateo, CA (US); Andrew S. Cassidy, San Jose, CA (US); Myron D. Flickner, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 16/115,258

(22) Filed: Aug. 28, 2018

(65) Prior Publication Data
US 2020/0074989 A1 Mar. 5, 2020

(51) Int. Cl.
*G10L 15/16* (2006.01)
*G06N 3/02* (2006.01)
(Continued)

(52) U.S. Cl.
CPC ............ *G10L 15/16* (2013.01); *G06N 3/0454* (2013.01); *G06N 3/06* (2013.01); *G06N 3/061* (2013.01);
(Continued)

(58) Field of Classification Search
None
See application file for complete search history.

(56) References Cited

U.S. PATENT DOCUMENTS 5,583,961 A * 12/1996 Pawlewski ............ G10L 25/87
704/241
5,737,485 A * 4/1998 Flanagan ................ G10L 15/16
704/232
(Continued)

OTHER PUBLICATIONS

S. K. Esser and et al., "Convolutional networks for fast, energy-efficient neuromorphic computing,", Cornell University, https://arxiv.org/pdf/1603.08270.pdf, May 2016.*
(Continued)

*Primary Examiner* — Richard Z Zhu
(74) *Attorney, Agent, or Firm* — Erik Huestis; Stephen Kenny; Foley Hoag, LLP

(57) ABSTRACT

Low energy deep-learning networks for generating auditory features such as mel frequency cepstral coefficients in audio processing pipelines are provided. In various embodiments, a first neural network is trained to output auditory features such as mel-frequency cepstral coefficients, linear predictive coding coefficients, perceptual linear predictive coefficients, spectral coefficients, filter bank coefficients, and/or spectro-temporal receptive fields based on input audio samples. A second neural network is trained to output a classification based on input auditory features such as mel-frequency cepstral coefficients. An input audio sample is provided to the first neural network. Auditory features such as mel-frequency cepstral coefficients are received from the first neural network. The auditory features such as mel-frequency cepstral coefficients are provided to the second neural network. A classification of the input audio sample is received from the second neural network.

20 Claims, 10 Drawing Sheets

(51) Int. Cl.
  *G10L 15/06*   (2013.01)
  *G06N 3/06*   (2006.01)
  *G10L 25/30*   (2013.01)
  *G06N 3/04*   (2006.01)
  *G10L 25/24*   (2013.01)
  *G10L 25/12*   (2013.01)
  *G06N 3/08*   (2006.01)
  *G10L 15/02*   (2006.01)

(52) U.S. Cl.
  CPC .............. *G06N 3/08* (2013.01); *G10L 15/063* (2013.01); *G10L 25/12* (2013.01); *G10L 25/24* (2013.01); *G10L 25/30* (2013.01); *G10L 15/02* (2013.01)

(56) References Cited

U.S. PATENT DOCUMENTS

| | | | | |
|---|---|---|---|---|
| 6,691,090 | B1* | 2/2004 | Laurila | G10L 15/02 704/205 |
| 8,412,526 | B2* | 4/2013 | Sorin | G10L 19/02 704/256 |
| 9,665,823 | B2* | 5/2017 | Saon | G06N 3/08 |
| 9,911,413 | B1* | 3/2018 | Kumar | G06F 40/35 |
| 10,460,747 | B2* | 10/2019 | Roblek | G06N 3/088 |
| 10,867,238 | B2* | 12/2020 | Davies | G06N 3/08 |
| 2005/0049470 | A1* | 3/2005 | Terry | A61B 5/14552 600/323 |
| 2016/0140956 | A1* | 5/2016 | Yu | G10L 15/16 704/240 |
| 2020/0066278 | A1* | 2/2020 | Steelberg | G06F 40/20 |
| 2020/0075019 | A1* | 3/2020 | Steelberg | G10L 15/02 |

OTHER PUBLICATIONS

Fayek, "Speech Processing for Machine Learning: Filter banks, Mel-Frequency Cepstral Coefficients (MFCCs) and What's In-Between", https://haythamfayek.com/2016/04/21/speech-processing-for-machine-learning.html, Apr. 2016.*

Misra et al., "New Entropy Based Combination Rules in HMM/ANN Multi-Stream ASR", 2003 IEEE International Conference on Acoustics, Speech, and Signal Processing, 2003. Proceedings. (ICASSP '03)., Hong Kong, 2003, pp. II-741.*

"Deep Speech 3: Even more end-to-end speech recognition," Baidu Research, (2017). Accessed Online http://research.baidu.com/Blog/index-view?id=90.

Amodei et al., "Deep Speech 2: End-to-End Speech Recognition in English and Mandarin," International Conference on Machine Learning, 173-182 (2016).

Hannun et al., "Deep Speech: Scaling up end-to-end speech recognition," ArXiv Preprint ArXiv, 1412: 5567 (2014).

Lu et al., "SpeakerSense: Energy Efficient Unobtrusive Speaker Identification on Mobile Phones," International Conference on Pervasive Computing, pp. 188-205 (2011).

Merolla et al., "A million spikin-neuron integrated circuit with a scalable communication network and interface," Science, 345(6197):668-673 (2014).

Price et al., A Low-Power Speech Recognizer and Voice Activity Detector Using Deep Neural Networks, IEEE Journal of Solid-State Circuits (2017).

Shen et al., "Design and Optimization of a Distributed, Embedded Speech Recognition System," International Workshop of Paralle and Distributed Real-Time Systems, (2008).

Smith et al., "A Novel Digital Neuromorphic Architecture Efficiently Faciltating Complex Synaptic Response Functions Applied to Liquid State Machines," IEEE (2017).

* cited by examiner

LOW ENERGY DEEP-LEARNING NETWORKS FOR GENERATING AUDITORY FEATURES FOR AUDIO PROCESSING PIPELINES

BACKGROUND

Embodiments of the present disclosure relate to speech recognition, and more specifically, to low energy deep-learning networks for generating auditory features such as mel frequency cepstral coefficients (MFCCs), linear predictive coding coefficients (LPCs), perceptual linear predictive (PLP) coefficients, spectral coefficients, filter bank coefficients, and/or spectro-temporal receptive fields (STRFs) in audio processing pipelines.

BRIEF SUMMARY

According to embodiments of the present disclosure, methods of and computer program products for speech recognition are provided. In various embodiments, a first neural network is trained to output auditory features such as mel-frequency cepstral coefficients, linear predictive coding coefficients, perceptual linear predictive coefficients, spectral coefficients, filter bank coefficients, and/or spectro-temporal receptive fields based on input audio samples. A second neural network is trained to output a classification based on input auditory features such as mel-frequency cepstral coefficients. An input audio sample is provided to the first neural network. Auditory features such as mel-frequency cepstral coefficients are received from the first neural network. The auditory features such as mel-frequency cepstral coefficients are provided to the second neural network. A classification of the input audio sample is received from the second neural network.

DETAILED DESCRIPTION

Figure 1:
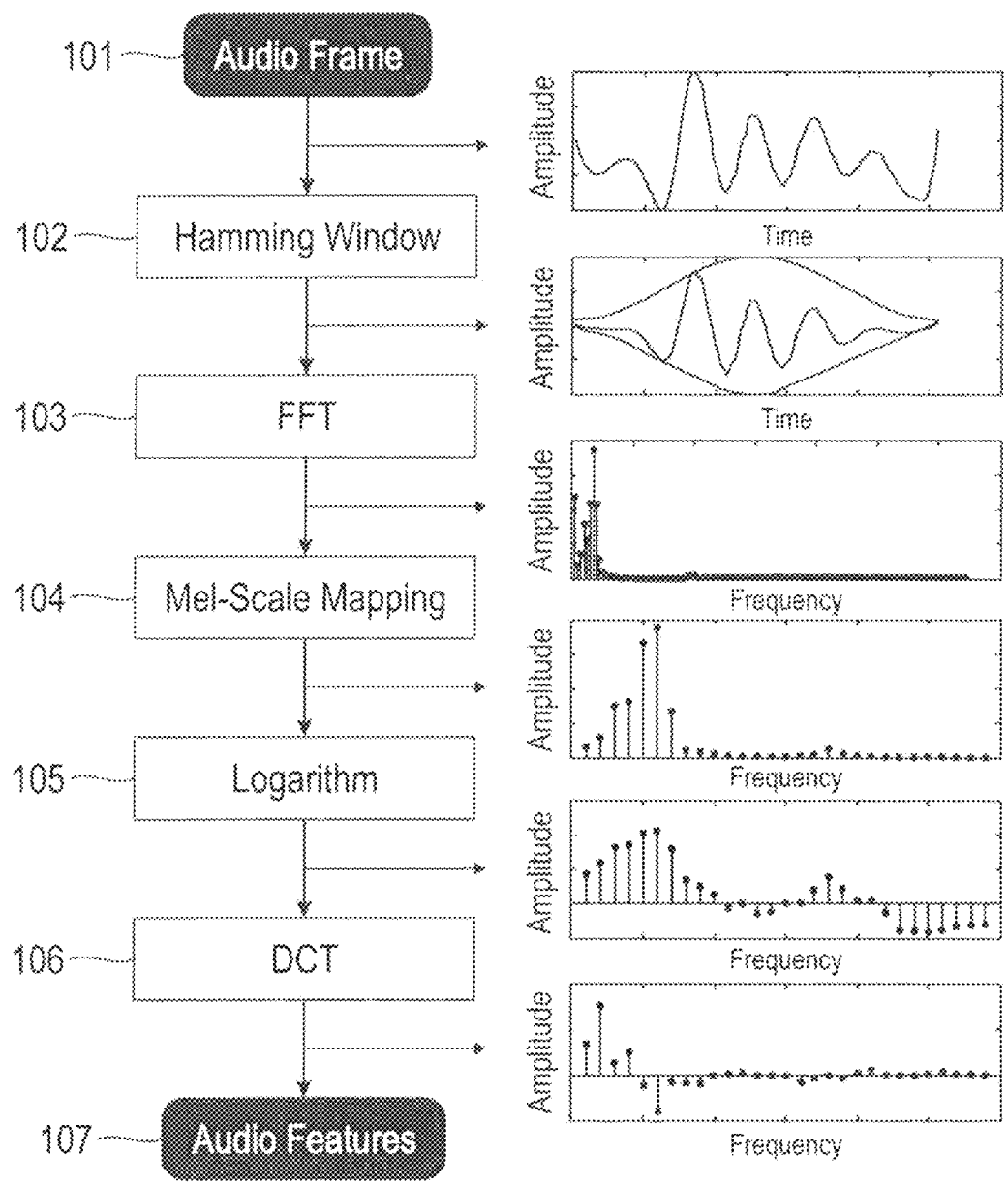
FIG. 1 illustrates generation of mel-frequency cepstral coefficients (MFCCs).

Automatic speech recognition (ASR) systems, including those based on convolutional neural networks (CNNs), process input features that are extracted from the raw speech signal in a preprocessing step. For CNN-based systems, these features are used to train a network to correctly classify phonemes, words, or other speech segments associated with the audio input. The output from this classification step may then be post-processed to generate the final output words or sentences.

Extraction of auditory features such as mel-frequency cepstral coefficients (MFCCs) from the speech signal is one preprocessing method that gives good results in speech recognition applications. In particular, MFCC gives a low phoneme or word error rates from the classification step of the ASR system. However, it will be appreciated that a variety of other auditory features may be used as described herein.

The raw speech signal may be provided as the direct input to neural network based ASR systems, relying on the network training to extract the optimal features for the classification task. Such learned feature extraction may be achieved through unsupervised learning of the features that characterize the audio signal, or supervised training of a word or phoneme classifier that uses the raw audio signal as its input, so that the first layer or layers of the classifier network may carry out the necessary feature extraction.

Unsupervised learning of audio features requires a generative model, for example a restricted Boltzmann machine (RBM), or a hierarchy of RBMs that make up a deep belief network (DBM). Such a model uses hidden neural network layers to generate a reconstruction of an input signal, then trains the weights from those inputs to the hidden layers to minimize the reconstruction error. The outputs from the hidden layers are used as input features, against which a phoneme or word classifier can be trained.

Supervised learning approaches use the raw audio signal as input for a multilayer classifier, trained against labeled phonemes, words or other output features. The first layer or layers of the classifier may then be regarded as feature extraction layers. The first classifier layers may have the same architecture as the rest of the network, so that no clear boundary between feature extraction and classifier layers exists, or may have a different architecture or training method, and may therefore be separable from the rest of the network. For example, feature extraction layers could be trained as part of a network used to classify phonemes from one dataset, but used as part of a network trained against phonemes from another dataset.

The present disclosure provides supervised training of convolutional networks to generate the feature representations themselves, rather than the final phoneme or word outputs. This approach is advantageous over the alternatives discussed above, with respect to modularity and generality, reduced network size, performance, and compatibility with spike-based neuromorphic processors such as TrueNorth.

Various examples are described herein in terms of mel-frequency cepstral coefficients (MFCCs). However, the present disclosure is applicable to other auditory features. For example, such alternative features may include Linear Predictive Coding (LPC) coefficients, Perceptual Linear Predictive (PLP) coefficients, spectral coefficients (e.g., FFT, DCT, log-FFT), filter bank coefficients (e.g., gammatone, wavelet), or Spectro-Temporal Receptive Fields (STRFs).

Referring to FIG. 1, generation of MFCCs is illustrated. A hamming window 102 is applied to input audio frame 101. A Fourier transform 103 is taken of this windowed excerpt of the signal. The powers of the spectrum obtained above are mapped at 104 onto the mel scale, using triangular overlapping windows. The logarithms of the powers at each of the mel frequencies are taken at 105. The discrete cosine transform (DCT) is taken of the list of mel log powers at 106, as if it were a signal. The output audio features 107 are the amplitudes of the resulting spectrum.

Figure 2:
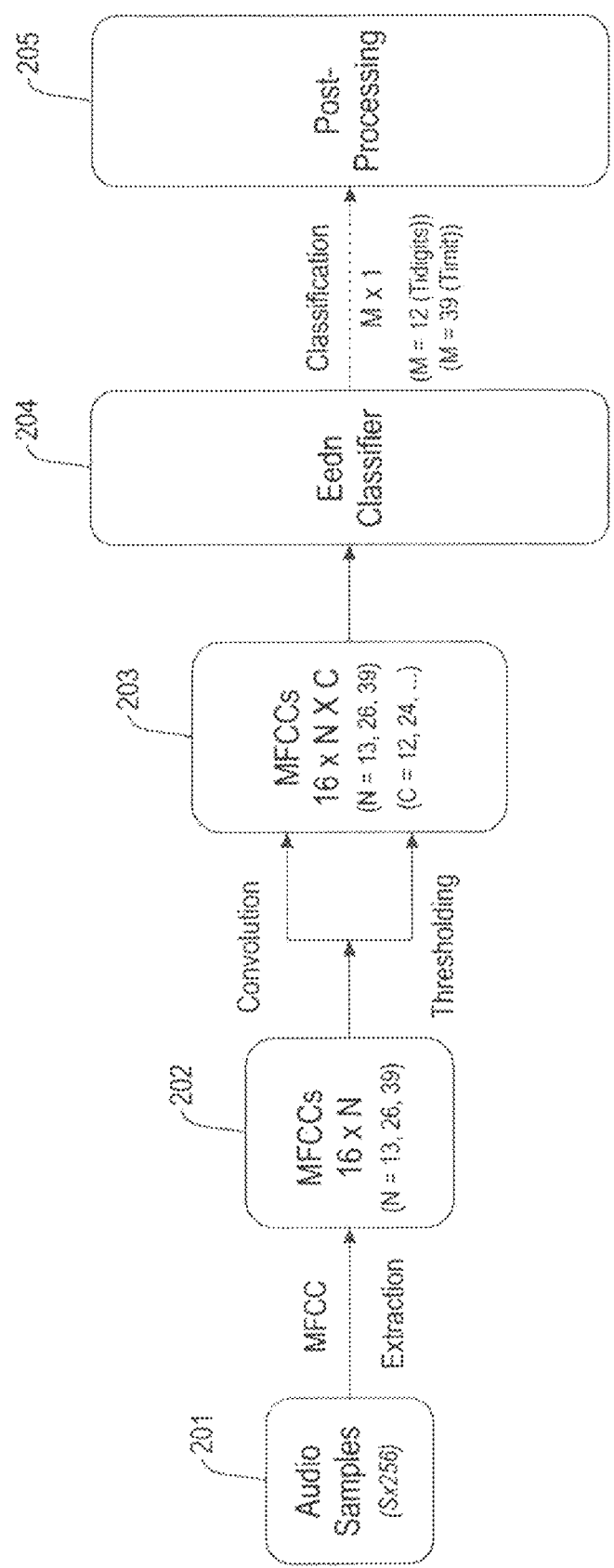
FIG. 2 illustrates an exemplary speech processing system using MFCC audio features according to embodiments of the present disclosure.

Referring to FIG. 2, an exemplary speech processing system using MFCC audio features is illustrated according to embodiments of the present disclosure. MFCCs 202 are extracted from audio samples 201, e.g., as set out above. In this example, S sets of 256 samples are provided, with S=16. The resulting MFCCs have 16 sets of parameters, having N parameters each, where N is 13, 26 or 39. Convolution and thresholding are applied to the MFCCs, resulting in a feature vector 203 of 16×N×C. This feature vector is provided to a classifier 204, which in some embodiments is an EEDN classifier. Classifier 204 outputs a classification, which in this example is an M×1 vector. M may vary based on the number of class labels. For example, in an exemplary embodiment using the TIDIGITS corpus M may be 12, while in an exemplary embodiment using the TIMIT corpus, M may be 39.

As noted above, in some embodiments an EEDN (Energy-Efficient Deep Neuromorphic networks) based classifier is used. EEDN is described more fully in *Convolutional Networks for Fast, Energy-Efficient Neuromorphic Computing*; Esser, et al., arXiv:1603.08270v2 (https://arxiv.org/pdf/1603.08270.pdf), which is hereby incorporated by reference. EEDN provides a deep convolutional neural network suited for deployment on spike-based neuromorphic processors such as TrueNorth. In particular, in some embodiments, classifier 204 is an EEDN. However, it will be appreciate that a variety of alternative classifiers may be used as set out herein.

In general, a deep convolutional network may be used as a classifier in the various embodiments described herein. A deep convolutional network is a multilayer feedforward neural network, whose input is typically image-like and whose layers are neurons that collectively perform a convolutional filtering of the input or a prior layer. Neurons within a layer are arranged in two spatial dimensions, corresponding to shifts in the convolution filter, and one feature dimension, corresponding to different filters.

Figure 3:
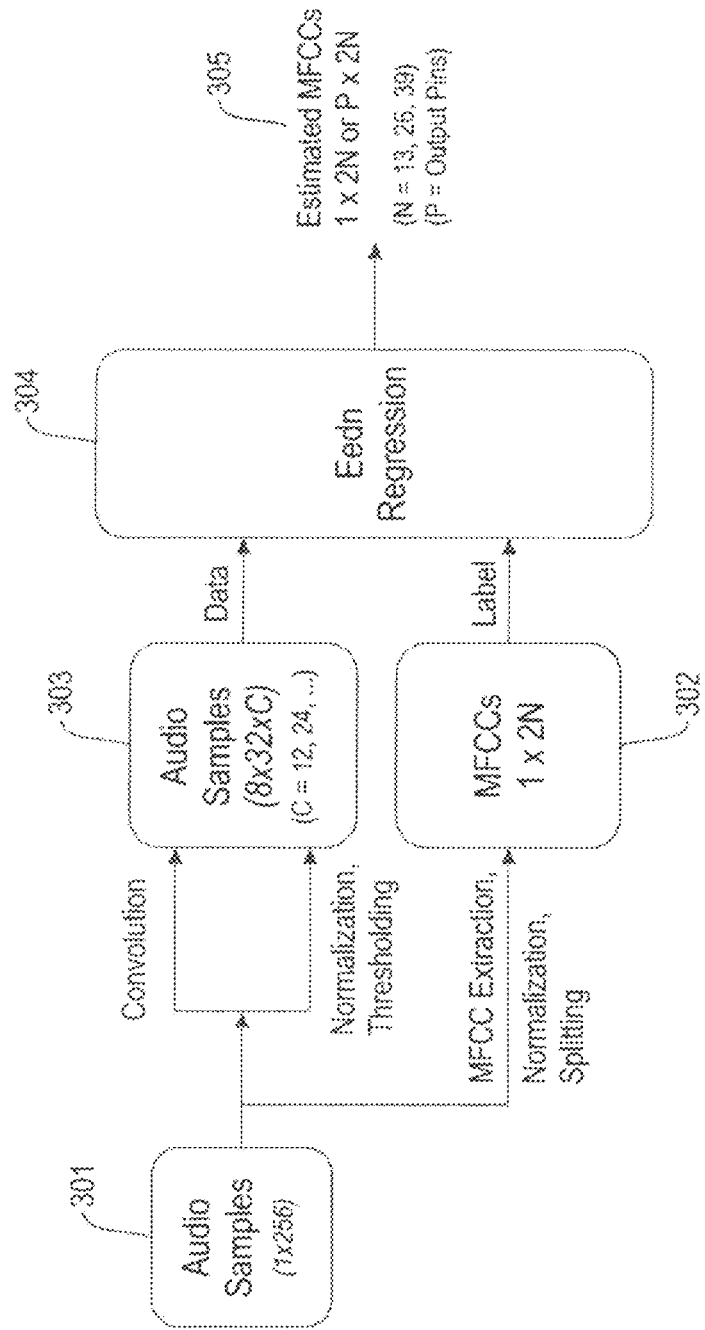
FIG. 3 illustrates a system for estimating MFCCs through regression according to embodiments of the present disclosure.

Referring to FIG. 3, a system for estimating MFCCs through regression is illustrated according to embodiments of the present disclosure. MFCCs 302 are extracted from audio samples 301, e.g., as set out above. In this example, S sets of 256 samples are provided, with S=1. The resulting MFCCs have a set of parameters, having 2N parameters each, where N is 13, 26 or 39. These MFCCs are provided to deep network 304 as labels. Audio samples 301 are also convolved and thresholded to yield data vector 303 of 8×32×C. Data vector 303 and MFCC labels 302 are provided to network 304, which in some embodiment is an EEDN network. Network 304 is thereby trained to determine estimated MFCCs, which in this example are given as a 1×2N output vector, where N is 13, 26 or 39. In various embodiments, binary outputs are provided from network 304. In such embodiments, multiple binary output pins may be provided per value, thereby allowing a range of values, for example using a population code. The number of output pins per value is given as P.

Figure 4:
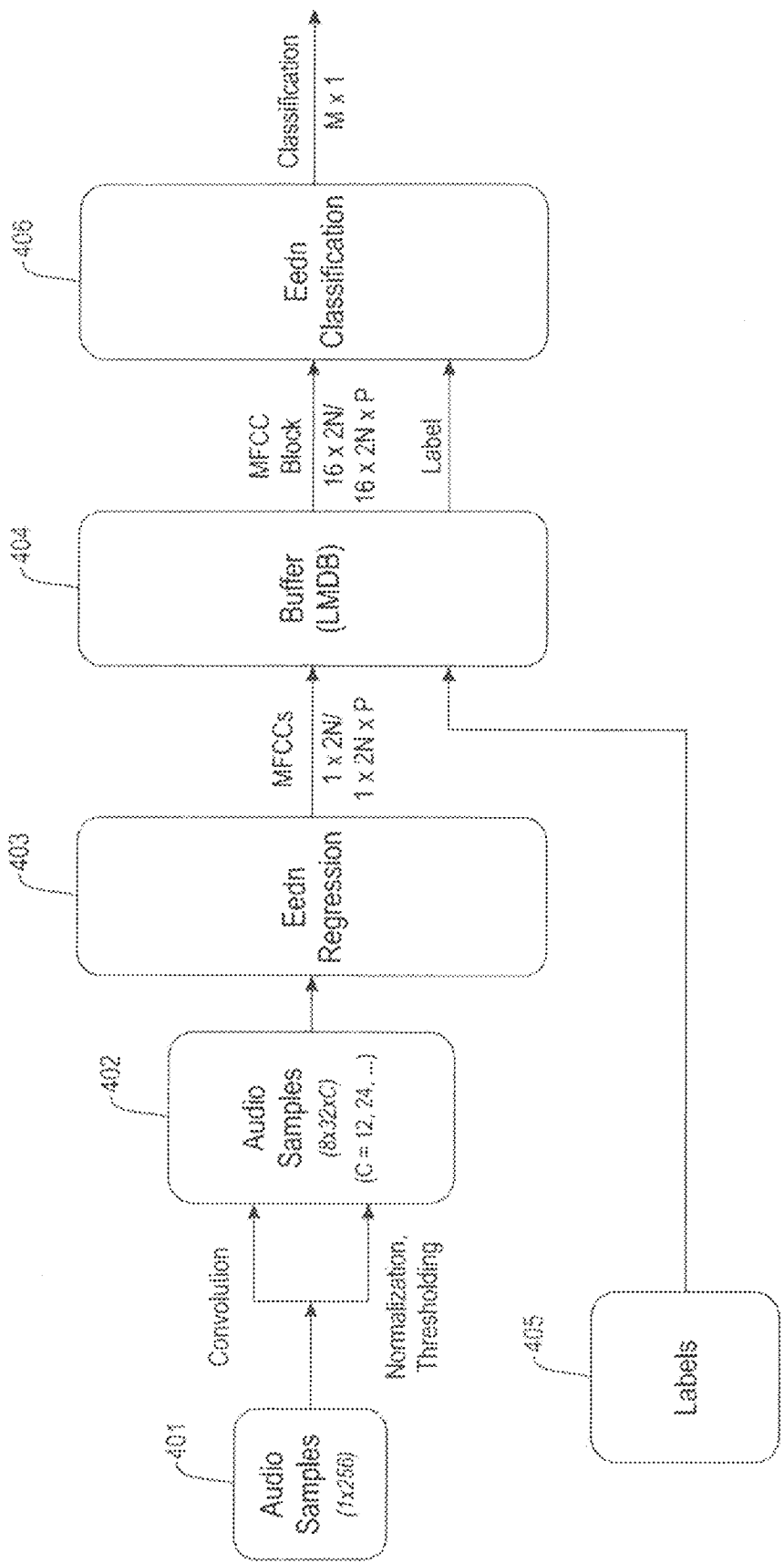
FIG. 4 illustrates a speech processing system using MFCC audio features according to embodiments of the present disclosure.

Referring to FIG. 4, an exemplary speech processing system using MFCC audio features is illustrated according to embodiments of the present disclosure. Audio samples 401 are convolved and thresholded to yield data vector 402 of 8×32×C. Data vector 402 is provided to network 403, for example the trained regression network described with regard to FIG. 3. Regression network 403 outputs estimated MFCCs, which in this example are given as a 1×2N output vector, where N is 13, 26 or 39. MFCCs are buffered in buffer 404, along with associated labels 405, for example, Phoneme/Digit Labels. In this example, sets of 16 MFCC parameters are provided to classifier 406, along with labels. Classifier 406 is thereby trained to output a classification. Classifier 406 outputs a classification, which in this example is an M×1 vector.

Figure 5:
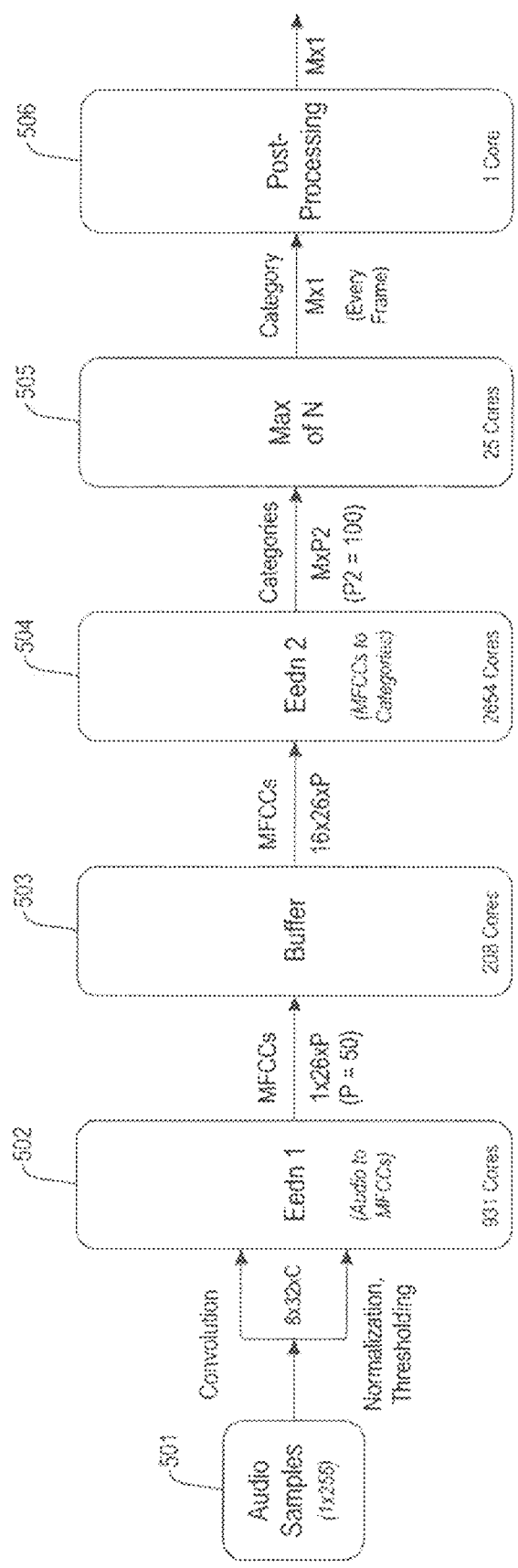
FIG. 5 illustrates an audio processing pipeline according to embodiments of the present disclosure.

Referring now to FIG. 5, a complete audio processing pipeline is illustrated according to embodiments of the present disclosure. In this example, audio processing is generally separated into two phases, an audio to MFCC phase and a MFCC to category phase, both performed by a trained deep network. Audio samples 501 are convolved and thresholded to yield a data vector of 8×32×C, where C is, e.g., 12. The data vector is provided to first network 502, for example the trained regression network described with regard to FIG. 3. First network 502 outputs estimated MFCCs, which in this example are given as a 1×2N×P output vector, where N is 13 and P=50. In this example, 50 binary pins are used per value, thereby allowing a range of values through population code. MFCCs are buffered in buffer 503. In this example, once a set of 16 MFCC parameters are collected in buffer 503, they are provided to second network 504, which may be a classifier as described above. Second network 504 outputs a category vector, which reflects the likelihood of classification in each of M categories, and in this example is an M×$P_2$ vector, with $P_2$=100. Max layer 505 determines the highest probability category, outputting an M×1 vector. Post processing 506 may then be performed.

The feature extraction architecture described here, which is trained against the audio features (MFCCs) themselves rather than the desired classifier outputs (phonemes, words, etc.), is a stand-alone system that can be incorporated into any classifier architecture, and used to generate features for training against any output type or input dataset. Feature extraction layers trained as part of a network that uses raw audio input to classify phonemes or words, on the other hand, may be difficult to cleanly separate from the rest of the classifier network, may need to be retrained for each change in the rest of the classifier network, and might not be generally useable against all input datasets.

Correct classification of an audio signal relies on not just on the signal itself, but also its context, the audio before and after the signal in question. If MFCCs are used as the input to a classification network, they may be calculated for a block of audio samples representing 12-16 milliseconds, but will then be assembled into blocks of 8 to 16 sets of coefficients, representing up to 256 milliseconds of audio.

Calculation of the MFCCs themselves may also require contextual audio signals. For the architecture described here, MFCC's were calculated for a block of 256 audio samples (representing 12.8 msec for the TIDIGITS dataset, or 16 msec for TIMIT). Calculation of 13 MFCC parameters for this sample requires just the 256 samples themselves, but calculation of 26 MFCC parameters (13 parameters plus their first derivatives) requires a block of 11 sets of 256 samples (the sample itself and 5 sets of 256 samples taken before the samples in question, and 5 taken after), while 39 MFCC parameters (13 parameters, plus their first and second derivatives, a typical parameter set) requires 13 sets of 256 samples. (The 13, 26 or 39 MFCC parameters are then assembled into the sets of coefficients described above, yielding a typical network input size of 16×13, 16×26 or 16×39.)

A classification network that is using raw audio signals for input, therefore, must have an input size sufficient for the audio signal and its entire context. As shown in Table 1, such input sizes may yield very large classification networks.

TABLE 1

| Input Type | Input Size | Classifier Size | Classification Accuracy |
| --- | --- | --- | --- |
| (1) Raw Audio | 16 × 128 × 1 | 9652 cores | 69.9% |
| (2) Complex FFT | 16 × 128 × 2 | 9652 | 74.0% |
| (3) LATTE Corelet Output | 16 × 64 × 1 | 4501 | 70.5% |
| (4) MFCC (13 Params) | 16 × 13 × 1 | 1010 | 86.5% |
| (5) MFCC (26 Params) | 16 × 26 × 1 | 1998 | 89.4% |
| (6) MFCC (39 Params) | 16 × 39 × 1 | 2780 | 89.6% |
| (7) MFCC From Corelet (13 Params, rectified) | 16 × 26 × 1 | 1998 | 86.7% |
| (8) MFCC From Corelet (13 Params, rectified, collected output pins) | 16 × 26 × 50 | 2654 | 76.4% |

Table 1 shows the size and classification Accuracy for TIDIGITS EEDN classification networks. Input to each of the EEDN classifiers was generated from 4096 (consecutive) audio samples. (1), every other audio sample was used as direct input to the classifier; (2) 256 audio samples were used to generate complex FFTs, blocks of 16 sets of the first 128 elements of the FFT's were used as input to the classifier (with separate channels for real and imaginary components); (3-6) 13, 26 or 39 MFCC parameters were calculated for successive sets of 256 audio samples, and blocks of 16 sets of such parameters were used as input to the classifier; (7-8) 256 audio samples were used as input to the MFCC corelet, and corelet outputs for each of the 13 estimated MFCC parameters were summed and used as input to the EEDN classifier (7), or the binary activity of the 50 most active output pins representing each of 13 MFCC parameters was collected and used as input to the Eedn classifier (spread over 50 input channels).

The internal MFCC estimation architecture described here collects only the input signals required for the MFCC calculation itself; since the current architecture generates only 13 parameters, just 256 audio signals are needed (rectified into two input channels, representing positive and negative components of the input). MFCC parameters are buffered internally over time, supplying the classification network with a block of 16×13 parameters. This allows for greatly reduced network size.

In particular, in embodiments using TrueNorth, the network is small enough for the combined feature extraction, buffering and classification networks to fit on one True North chip. In the example of FIG. 5, first network 502 requires 931 cores, buffer 503 requires 208 cores, second network 504 requires 2654 cores, max layer 505 requires 25 cores, and post-processing 506 requires 1 core. The total of 3819 cores can fit on one TrueNorth chip.

Figure 6:
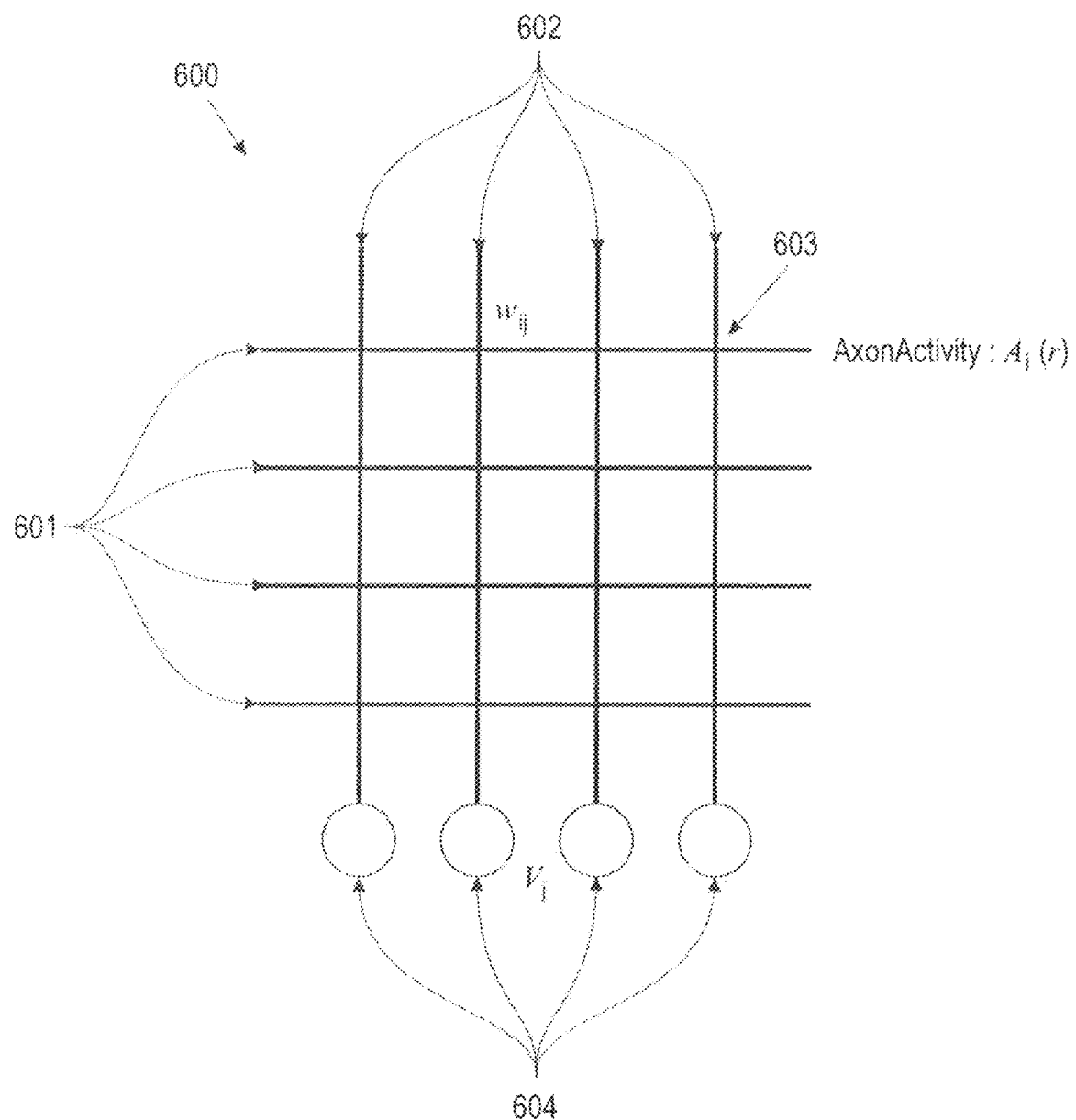
FIG. 6 depicts a neurosynaptic core according to embodiments of the present disclosure.
Figure 7:
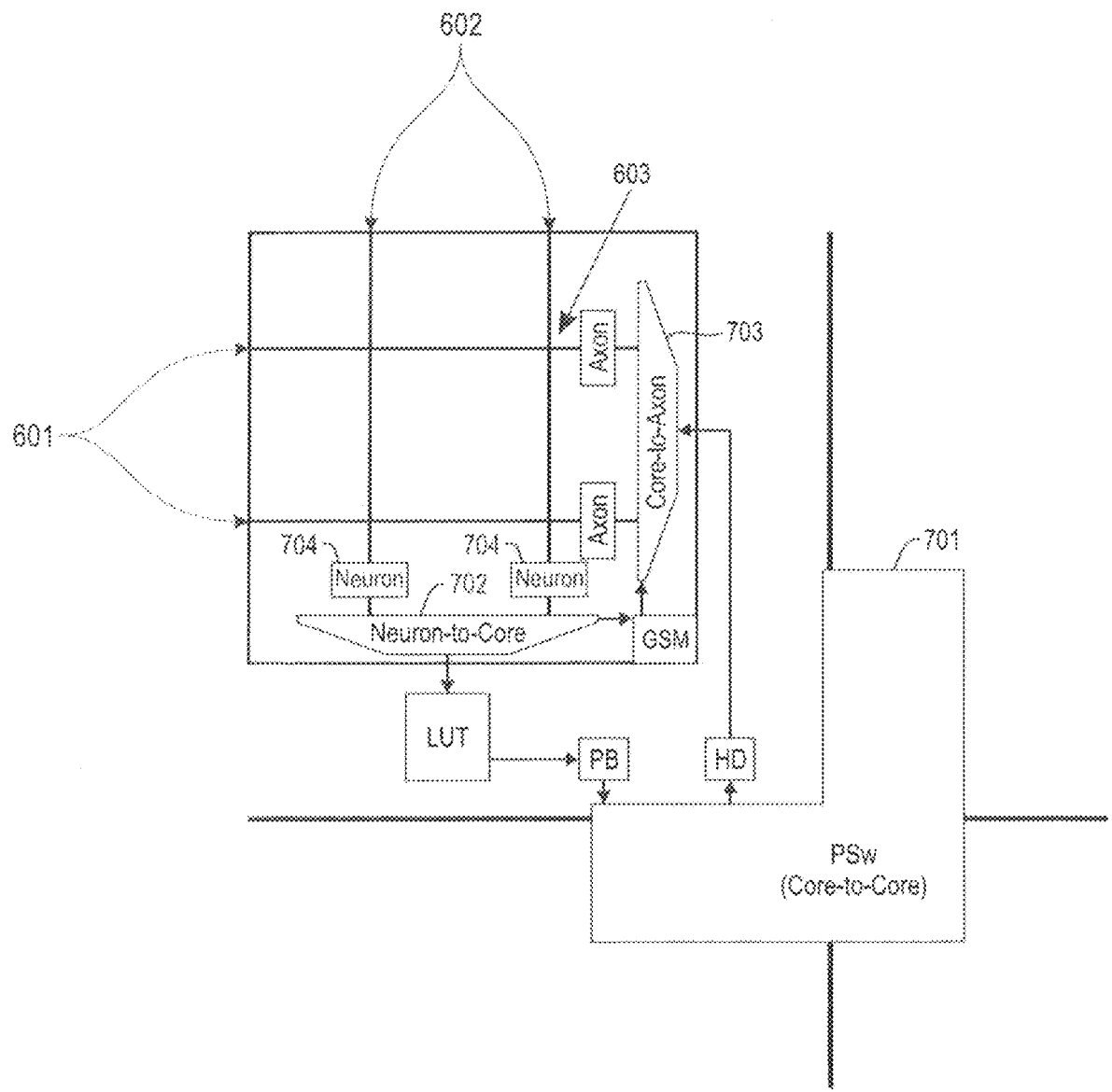
FIG. 7 depicts a neurosynaptic core and mesh router according to embodiments of the present disclosure.

Referring to FIGS. 6-7, an exemplary TrueNorth architecture is illustrated. Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemes.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-andconquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

With reference now to FIG. 6, a neurosynaptic core according to embodiments of the present disclosure is depicted. In some embodiments, neurosynaptic core 600 includes axons 601, represented as rows, dendrites 602, represented as columns, synapses 603, represented as row-column junctions, and neurons 604 that receive inputs from dendrites. In some embodiments, there are 256 axons, and 256 neurons. In such embodiments, there are 256×256=65,536 synapses. Information flows from axons 601 to the neurons 604, modulated by the synapses 603. In various embodiments, the synapses may be binary, and may be associated with synaptic weights.

In some embodiments a plurality of neurosynaptic cores are tiled on a chip. In an exemplary embodiments, a 64 by 64 grid of cores is tiled, yielding 4,096 cores, for a total of 1,048,576 neurons and 268,435,456 synapses. In such embodiments, neurons, synapses, and short-distance connectivity are implemented by the core circuit. Long-distance connectivity is logical. An exemplary embodiment is depicted in FIG. 7. Mesh router 701 provides communication between cores. Also on a given core, neuron to core 702 and core to axon 703 communication links are provided.

Figure 8:
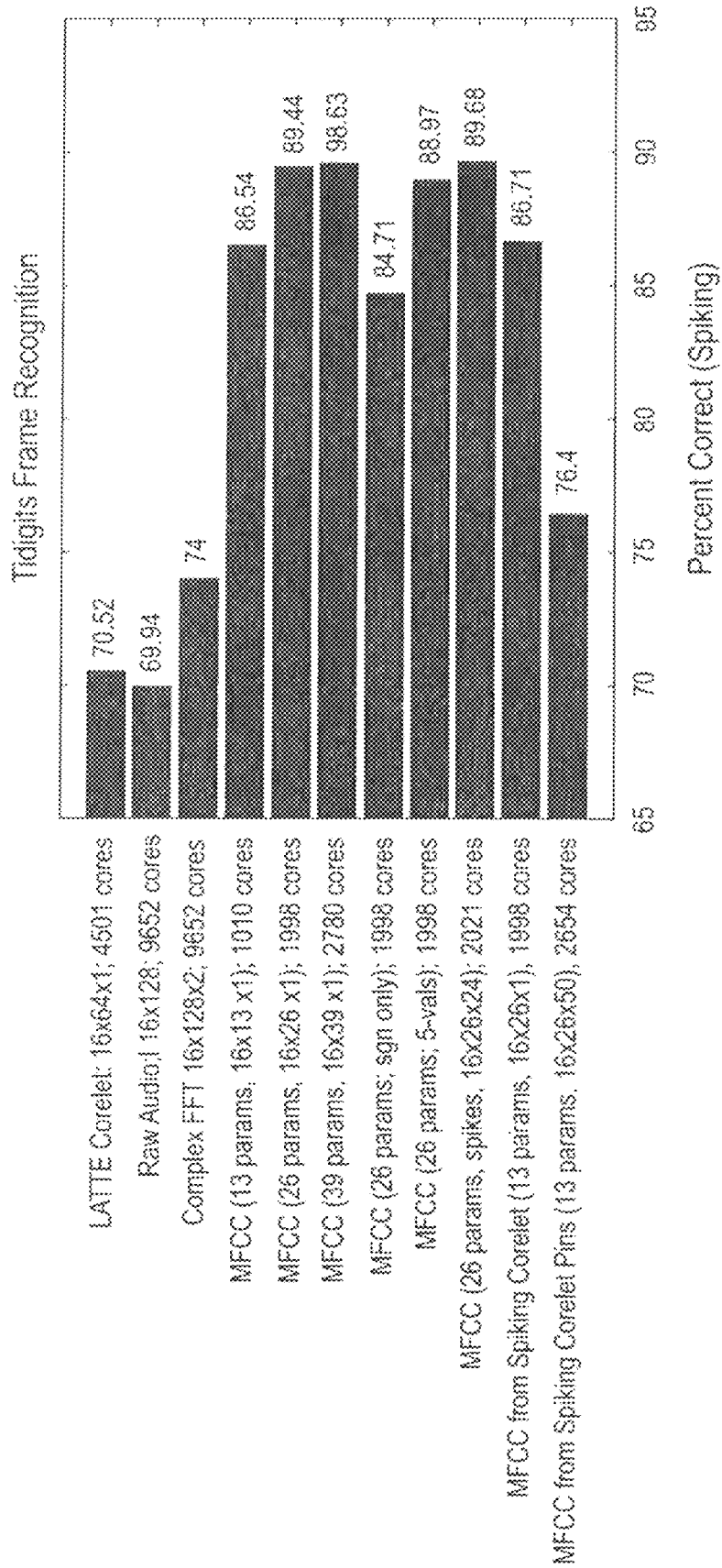
FIG. 8 illustrates frame recognition accuracy for various transduction methods on the TIDIGITS dataset.

Referring to FIG. 8, frame recognition accuracy is graphed for various transduction methods on the TIDIGITS dataset. Table 1, above, shows the results of training an EEDN network trained to classify digits from the TIDIGITS dataset, using raw audio data, FFTs, output from a LATTE corelet, directly calculated MFCCs, or MFCC estimates generated from an EEDN network. These results show that networks using raw audio data as input use more than 3 times the number of cores as even the largest network that uses MFCCs, while giving substantially reduced performance. Similar results were seen for networks trained to classify phonemes from the TIMIT dataset.

Various exemplary embodiments described herein use EEDN convolutional networks to generate estimates of MFCCs, which are trained using standard methods of training EEDN networks. As EEDN networks, their architecture, timing, and conversion into True North corelets are well characterized, and such networks can be cleanly merged into a processing pipeline. However, it will be appreciated that alternative platforms may be used for suitable convolutional networks.

Figure 9:
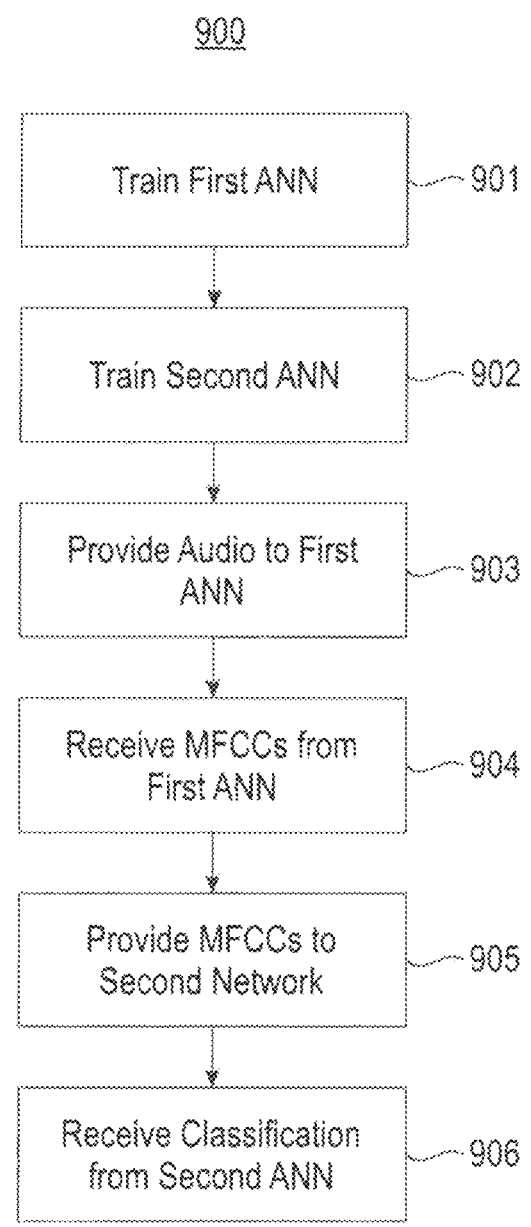
FIG. 9 illustrates a method of speech recognition according to embodiments of the present disclosure.

Referring now to FIG. 9, a method of speech recognition is illustrated according to embodiments of the present disclosure. At 901, a first neural network is trained to output auditory features such as mel-frequency cepstral coefficients based on input audio samples. At 902, a second neural network is trained to output a classification based on input auditory features such as mel-frequency cepstral coefficients. At 903, an input audio sample is provided to the first neural network. At 904, auditory features such as mel-frequency cepstral coefficients are received from the first neural network. At 905, the auditory features such as mel-frequency cepstral coefficients are provided to the second neural network. At 906, a classification of the input audio sample is received from the second neural network.

Figure 10:
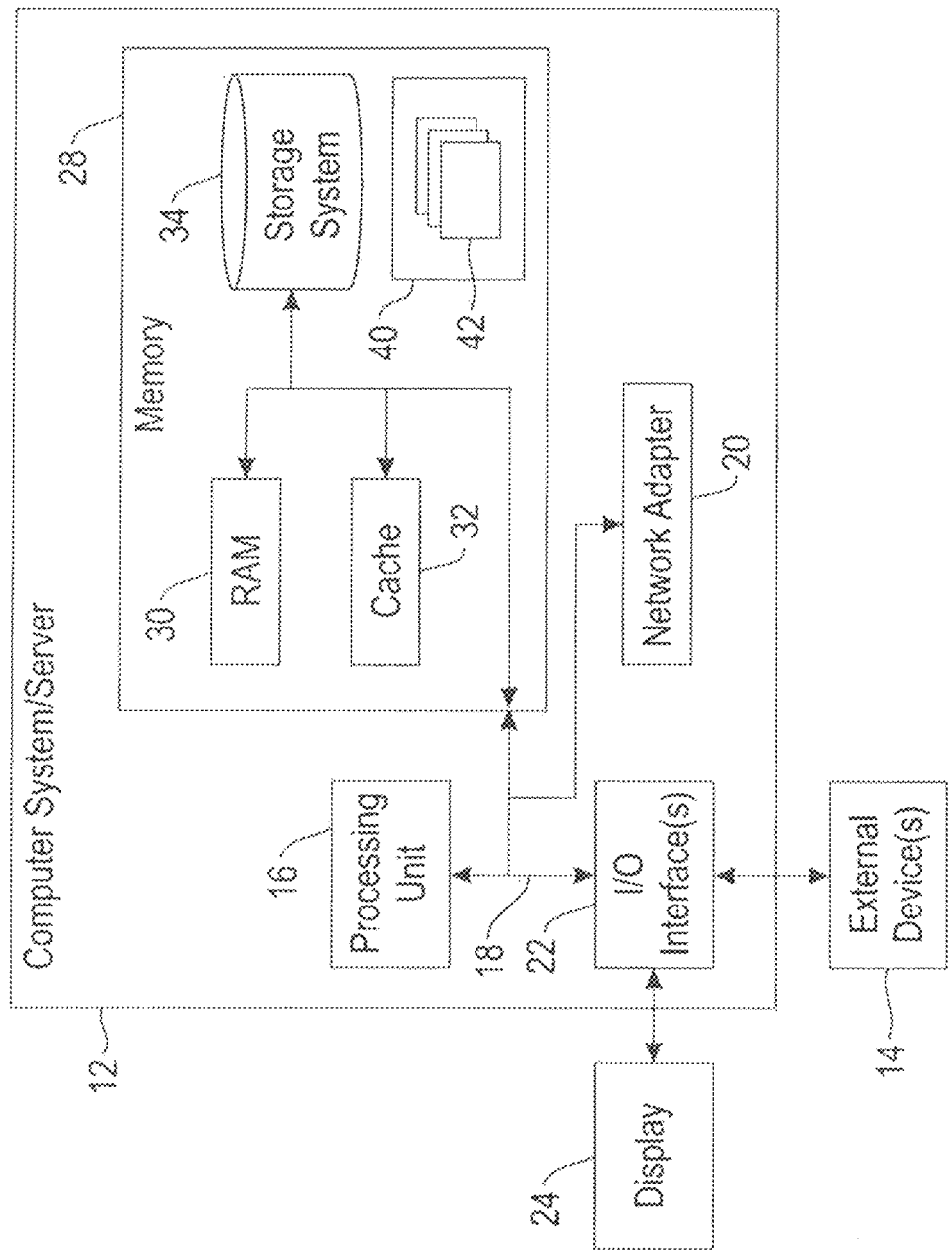
FIG. 10 depicts a computing node according to an embodiment of the present disclosure.

Referring now to FIG. 10, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A neurosynaptic chip comprising:
a first artificial neural network,
the first artificial neural network being trained to receive convolved and thresholded input audio samples represented as a data vector and output auditory features based on the convolved and thresholded input audio samples, wherein the first artificial neural network comprises a regression network operating on one or more spike-based neurosynaptic chip, wherein the auditory features comprise estimated mel-frequency cepstral coefficients;
a second artificial neural network,
the second artificial neural network being operatively coupled to the first artificial neural network and receiving therefrom the auditory features, the second artificial neural network being trained to output a classification of the input audio samples based on the auditory features.

2. The neurosynaptic chip of claim 1, wherein the auditory features comprise linear predictive coding coefficients, perceptual linear predictive coefficients, spectral coefficients, filter bank coefficients, and/or spectro-temporal receptive fields.

3. The neurosynaptic chip of claim 1, wherein the auditory features comprise a combination of linear predictive coding coefficients, perceptual linear predictive coefficients, spectral coefficients, filter bank coefficients, and/or spectro-temporal receptive fields.

4. The neurosynaptic chip of claim 1, wherein the classification is of phonemes, words, or speech segments.

5. The neurosynaptic chip of claim 1, wherein the first neural network is a convolutional neural network.

6. The neurosynaptic chip of claim 1, wherein the second neural network is a convolutional neural network.

7. The neurosynaptic chip of claim 1, wherein the input audio samples comprise speech.

8. The neurosynaptic chip of claim 1, wherein the first neural network is an EEDN network.

9. The neurosynaptic chip of claim 1, wherein the second neural network is an EEDN network.

10. The neurosynaptic chip of claim 1, further comprising:
a buffer between the first and second artificial neural networks,
the buffer being configured to collect the mel-frequency cepstral coefficients from the first neural network and provide batches of the mel-frequency cepstral coefficients to the second neural network.

11. The neurosynaptic chip of claim 1, wherein the first neural network is further trained to output derivatives of the mel-frequency cepstral coefficients.

12. A method comprising:
training a first artificial neural network to output auditory features based on convolved and thresholded input audio samples represented as a data vector, wherein the first artificial neural network comprises a regression network operating on one or more spike-based neurosynaptic chip, wherein the auditory features comprise estimated mel-frequency cepstral coefficients;
training a second artificial neural network to output a classification based on input of the auditory features.

13. The method of claim 12, further comprising:
providing an input audio sample to the first neural network;
receiving from the first neural network auditory features;
providing the auditory features to the second neural network;
receiving from the second neural network a classification of the input audio sample.

14. The method of claim 13, wherein the auditory features comprise linear predictive coding coefficients, perceptual linear predictive coefficients, spectral coefficients, filter bank coefficients, and/or spectro-temporal receptive fields.

15. The method of claim 13, wherein the classification is of phonemes, words, or speech segments.

16. The method of claim 13, wherein the first and/or second neural network is a convolutional neural network.

17. The method of claim 13, wherein the input audio samples comprise speech.

18. A method comprising:
convolving and thresholding an input audio sample to thereby represent the input audio sample as a data vector;
providing the convolved and thresholded input audio sample to a first artificial neural network, wherein the first artificial neural network comprises a regression network operating on one or more spike-based neurosynaptic chip;

receiving, from the first artificial neural network, estimated mel-frequency cepstral coefficients;

providing the estimated mel-frequency cepstral coefficients to a second artificial neural network;

receiving, from the second neural network, a classification of the input audio sample.

19. The method of claim 18, further comprising providing the estimated mel-frequency cepstral coefficients to a buffer;

wherein the estimated mel-frequency cepstral coefficients are provided to the second neural network from the buffer after a predetermined number of sets of mel-frequency cepstral coefficients are received in the buffer.

20. The method of claim 18, wherein receiving the classification comprises:

receiving a category vector having a probability for each of a plurality of categories; and determining a highest probability category from the category vector.

* * * * *